United States Patent
Gilson et al.

(10) Patent No.: US 10,178,196 B2
(45) Date of Patent: Jan. 8, 2019

(54) LOCAL CACHE MAINTENANCE FOR MEDIA CONTENT

(71) Applicant: Comcast Cable Communications, LLC, Philadelphia, PA (US)

(72) Inventors: Ross Gilson, Philadelphia, PA (US); Derik Yarnell, Montrose, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 122 days.

(21) Appl. No.: 14/832,233

(22) Filed: Aug. 21, 2015

(65) Prior Publication Data

US 2017/0054822 A1    Feb. 23, 2017

(51) Int. Cl.
| | |
|---|---|
| G06F 15/167 | (2006.01) |
| H04L 29/08 | (2006.01) |
| G11B 27/10 | (2006.01) |
| H04N 21/433 | (2011.01) |
| H04N 21/6587 | (2011.01) |
| H04L 29/06 | (2006.01) |
| G11B 20/10 | (2006.01) |
| H04N 21/845 | (2011.01) |

(52) U.S. Cl.
CPC .......... *H04L 67/2842* (2013.01); *G11B 27/10* (2013.01); *H04L 65/4076* (2013.01); *H04L 65/60* (2013.01); *H04N 21/4331* (2013.01); *H04N 21/6587* (2013.01); *G11B 2020/1062* (2013.01); *H04N 21/8455* (2013.01)

(58) Field of Classification Search
CPC . H04L 67/2842; H04L 65/4076; H04L 65/60; H04N 21/4331; H04N 21/6587; H04N 21/8455; G11B 27/10; G11B 2020/1062
See application file for complete search history.

(56) References Cited

U.S. PATENT DOCUMENTS

| | | | | |
|---|---|---|---|---|
| 7,679,637 | B1* | 3/2010 | Kohler | H04L 12/1827 348/14.01 |
| 8,817,065 | B1* | 8/2014 | Mo | G06F 3/04842 348/14.08 |
| 2002/0040403 | A1* | 4/2002 | Goldhor | G10L 21/04 709/231 |
| 2002/0052967 | A1* | 5/2002 | Goldhor | G10L 21/04 709/231 |
| 2003/0123849 | A1* | 7/2003 | Nallur | G11B 27/105 386/279 |

(Continued)

FOREIGN PATENT DOCUMENTS

EP    1806919    7/2007

*Primary Examiner* — Richard G Keehn
(74) *Attorney, Agent, or Firm* — Baker & Hostetler LLP

(57) ABSTRACT

A media device and methods that identify playback states reachable from a current content playback state and identify a reachable state that is likely to occur, are disclosed. A memory associated with the media device may receive frames that enable a smooth transition between the playback state and the reachable state. The media device may receive frames that correspond to points in the content that are separated by an amount of time that is proportional to the playback rate of the likely state. The frames may be frames corresponding to an image that may be played back at the playback rate of the likely state.

20 Claims, 9 Drawing Sheets

(56) References Cited

U.S. PATENT DOCUMENTS

| | | | | |
|---|---|---|---|---|
| 2003/0167472 A1* | 9/2003 | Barbanson | ....... | H04N 21/23439 |
| | | | | 725/131 |
| 2003/0212997 A1* | 11/2003 | Hejna, Jr. | ................ | H04L 29/06 |
| | | | | 725/88 |
| 2006/0190809 A1* | 8/2006 | Hejna, Jr. | ................ | G10L 25/48 |
| | | | | 715/203 |
| 2008/0310814 A1* | 12/2008 | Bowra | ............. | H04N 21/23406 |
| | | | | 386/241 |
| 2013/0166772 A1* | 6/2013 | Tapio Kekki | .... | H04N 21/47217 |
| | | | | 709/234 |
| 2014/0359680 A1* | 12/2014 | Shivadas | ............ | H04N 21/8455 |
| | | | | 725/90 |

* cited by examiner

LOCAL CACHE MAINTENANCE FOR MEDIA CONTENT

BACKGROUND

Media content such as movies or live television may be streamed over a network, such as the Internet, to a media device. In some cases, the large amounts of data associated with media content, such as a movie, may make it impractical to transmit the content in its entirety to the media device prior to commencing playback. In other cases, such as a live broadcast, the entirety of the content may not be available when viewing commences.

Streaming of the media content may be interrupted due to a variety of possible technical factors. In some cases, conditions such as network congestion may cause delivery of the content to fail. In other cases, the media server might be overloaded and fall behind in transmitting content to the media device. Accordingly, in order to provide continuous playback, content may be transmitted from the media server and cached on the device prior to play back. Typically, the contents of the cache are maintained such that the cache includes content sufficient for several seconds of playback beyond the current playback location so that, in the event that the stream is disrupted, playback can continue uninterrupted using the contents of the cache. Existing systems and methods for maintaining cached content are lacking. These and other needs are presented and addressed in the present disclosure.

SUMMARY

Systems and methods for maintaining a local cache of media content are described. In an example, a media device comprises a memory on which a cache of media content is maintained. The media device may enter a first state in which a continuous segment of the media content is maintained in the cache, centered around a point in the content where the playback is occurring. For example, the media device may enter a normal playback state where it plays content from its cache at a normal rate. The continuous segment maintained in its cache may help to avoid display problems that may be caused by network slowdowns or other causes, as well as support functions such as fast-forwarding and rewinding. The continuous segment may also help avoid a need to establish a session with a media server in order to download additional content. Larger segments may offer better support for these functions, but the amount of memory space available for use by the cache may be limited. In addition, downloading larger content segments may cause higher utilization of bandwidth between the media device and the media server. The bandwidth utilization may also be wasted in cases where the content is not eventually played back, such as when a user of the media device stops watching the content.

The media device, while playing content in the first state, may identify other possible playback states that are reachable from the first state. For example, the media device in the normal playback state may identify that it may next be transitioned into a 2× fast-forward state in which the content is played back at two times the normal rate, or a reverse state in which the content is played back in reverse. The reachable playback states may, for example, be limited by controls available to a user of the media device. For example, where the media device has an interface indicating that fast forward is two times the normal rate, the playback states reachable from a state associated with normal-speed playback might not include a four-times normal playback rate.

From among the reachable states, the media device may select a state that is determined to be a possible next state. In an example scenario, the media device may determine that the next state may be a two times normal playback state. The media device may then request, from a media server providing the content, that the media server send it portions of the content that are separated by an amount of time that is based on a playback rate associated with the possible next state. In the scenario where the next state may be a state where content is played back at two times the normal rate, the media device may request content comprising every other frame of the content as this, in some encodings, would be sufficient for playback at the increased rate. The requested frames may be dependent on the encoding and the desired rate of playback. Each portion of the requested and received content may be a single frame of the content, rather than a continuous segment. If the media device does transition to this state, it may play back the content by displaying the downloaded portions. Since the downloaded portions of the content are temporally spaced according to the new playback rate, less space in the cache is used to store content that might be skipped while in the new state. In the event that the possible next state is not reached, less cache space may be used than if a larger continuous segment had been downloaded. In some instances, additional content, farther away from the current playback point, may be downloaded.

Additional advantages will be set forth in part in the description that follows or may be learned by practice. The advantages will be realized and attained by means of the elements and combinations listed in the appended claims. Both the foregoing general description and the following detailed description are exemplary and explanatory only.

BRIEF DESCRIPTION OF THE DRAWINGS

The accompanying drawings, which are incorporated in and constitute a part of this specification, illustrate embodiments or various aspects thereof, and together with the description, serve to explain the principles of the methods, systems, and computer program products.

DETAILED DESCRIPTION

Figure 1:
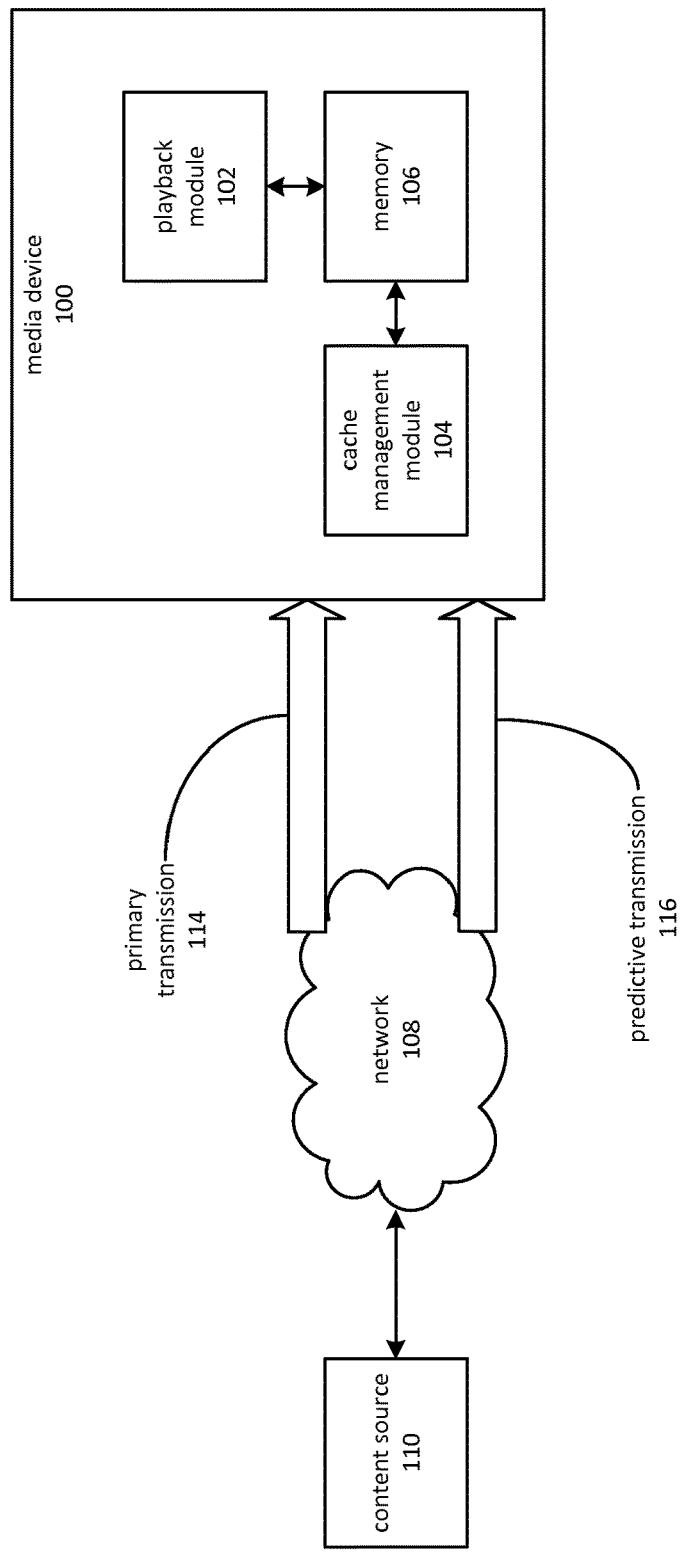
FIG. 1 is a block diagram depicting an example media distribution system.

The methods and systems described herein may involve maintaining a cache of media content for playback by a media device. The media device may maintain the cache for various reasons, which may include, but are not limited to, avoiding interruptions in playback caused by network congestion or server delays, support for operations such as fast-forwarding or rewinding, and so forth.

Playback of the content can include rendering audio and/or visual content, for example, represented by the data stored in the cache. Playback may also involve a decoding process in which compressed data is converted to a format that is suitable for rendering. Typically, content data is represented as frames, which can refer to a discreet representation of the media content at a particular point in time. The frames of the content can be represented in various ways, such as, for example, in one of the various Moving Picture Experts Group ("MPEG") formats. Playback of the content may include decoding the frame data according to the particular format being used and rendering the frames at an appropriate rate to produce (in the case of visual content) a moving image. Playback may also include processing of other data, such as data related to media device settings, surround lighting, and so forth.

The media device may support various playback states, such as, for example, playback at normal speed, fast-forwarding at various speed multiples, rewinding, skipping, and so forth. Each of these states may have an associated playback rate. The playback rate may refer to frames of content that are displayed per unit of time. For example, movies may be played at 24 frames per second. The playback rate can also correlate to frames that may be skipped during playback. For example, if each frame of the content is played back during normal-speed playback, then every other frame might be played back when the rate of playback is twice as high. In some instances, such as a skipping playback state, relatively large sections of content may be skipped, but playback may resume at normal speed starting at some demarcation point in the content, such as aligned with a chapter of content.

When the media device is in a particular playback state, there may be a set of other playback states that are reachable from the particular playback state. For example, when the media device is in the normal playback state and playing content at normal speed, the media device might support entering a 2× fast-forward state in which it displays content in a 2× fast-forward mode, and may also support entering a reverse state in which it displays content in a reverse or rewind mode. Other states, such as playing back content in a 4× fast-forward state, might not be reachable unless the media device first enters the 2× fast-forward state.

The media device may maintain a segment of content in the cache in order to support playback in the media device's current playback state. The segment may be a continuous segment, which refers to temporal continuity in the content. For example, the segment might consist of frame data over a non-interrupted thirty second period, centered on the current playback point of the media device. The segment may be maintained as a sliding window, so that as new frames are added to the head of the segment, old frames are removed from the end.

The media device may also maintain in cache additional portions of the content so as to be prepared to support a possible next state to which the media device may transition. The possible next state may be selected from those states that are reachable from the current state. In addition, the possible next state that is to be represented in the cache may be selected based on estimates of their respective likelihoods. For example, a fast-forward state might be estimated to be more likely than a rewind state when the current state is playback at normal speed. In some instances, contextual data of various types might be used, such as the current playback location, proximity to a commercial or other content feature, data concerning the presence of a user of the media device, and so on.

The media device may also maintain the additional portions of content for the next possible state as a sliding window. In an example embodiment, the additional portions may be discontinuous rather than continuous. In some instances, each portion may be a frame of content that is temporally separated from other frames by an amount of time that is selected based on the playback rate of the possible next state. For example, for a possible fast-forward state that plays back at twice normal speed, the downloaded frames maintained in cache might correspond to every other frame in the content. Where the next state is a fast-forward stat that plays at four times normal speed, the frames maintained in cache might correspond to every fourth frame in the original content.

If the possible next state is entered, playback in that state may use the discontinuous portions. In the scenario where the media device transitions into a fast forward state, the media device may play the discontinuous frames at a conventional frame rate, and thereby produce the effect of fast-forwarding through the content. Because each of the downloaded frames is used, less space in the cache may be used to store frames that may not be needed. Note that even if the fast-forward state was never entered, in some instances the downloaded frames might be incorporated into the continuous segment used to support the current state, which could help avoid duplicative downloads of the same frame, and might also allow for caching content that is further away from the current playback point.

FIG. 1 is a diagram depicting an example media distribution system. A content source 110, which can be a computing device such as a content server, may distribute content over a network 108 to a media device 100. The content source 110 may be any system that is programmed to transmit or access content consistent with the description herein, and may be, for example, a video/audio server, a content delivery network (CDN), a cable head end, or any other suitable system. Content can include any suitable audio and/or visual data such as, for example, movies, television programs, music, audio recordings, and so on. The content source 110 may transmit the content over the network 108 which my comprise any suitable networks including, for example, the Internet, a wide-area network, a local-area network, a cable network, etc. Due to the amount of data associated with the content, the content may be streamed rather than being downloaded in its entirety prior to playback. In some cases, as with a live television broadcast, the full set of content may not be available for download and the content source 110 may transmit data for the live broadcast as it occurs, or after a short delay.

The media device 100 may receive the transmitted content and cause it to be reproduced via a playback module 102. The media device 100 may be any system or device suitable to provide playback and caching features as described herein including, for example, a set top box, a desktop computing system, a tablet computing system, a mobile phone, etc. As shown, the media device 100 comprises a playback module 102. The playback module 102 might, for example, cause the content to be displayed on a video screen or output by an audio speaker. The playback module 102 may obtain data for the content from a memory 106. The memory 106 may include various forms of non-transitory storage such as, for example, dynamic random access memory, flash memory, solid state drives, and so forth. The playback module 102 may use the memory 106 as a cache to avoid pauses, jitters, or other conditions that may be caused by irregular or unpredictable behavior on the part of the network 108. The playback module 102 may support functions such as rewinding, fast-forwarding, pausing, and skipping. The playback module 102 can use the content data stored in the memory 106 in order to support these functions with less latency than might occur if the data had to be retrieved directly from the content source 110.

The cache management module 104 may participate in receiving transmissions (e.g., streams, file transfers, etc.) of content from the content source 110 and storing data from the transmission, for example, in the memory 106. The content transmissions may comprise a primary transmission 114 and a predictive transmission 116. A stream may be communicated over a communications channel opened between the content source 110 and a component of the media device 100, such as the cache management module 104 and associated hardware for receiving data transmitted over the network 108.

In an example scenario, the content source 110 may transmit the primary transmission 114 for use by the media device 100 in the media device's 100 current state. For example, the media device might be in a normal-speed playback state, as might be the case when the media device is causing a movie or television program to be displayed on a screen at its conventional speed. The data transmitted by the content source 110 may comprise content frames. A frame can include key frames comprising complete images and differential frames describing differences with respect to a key frame. A key frame may sometimes be referred to as an "I-frame," while a differential frame may sometimes be referred to as a "P-frame" or "B-frame." Differential frames may be smaller than key frames because they describe the changes between a previous or subsequent frame rather than a complete image. When there is relatively little motion or other changes between two frames, a differential frame may be significantly smaller than a key frame. One the other hand, at certain points—such as when a scene changes—a key frame may be the best representation.

The predictive transmission 116 may be transmitted by the content source 110 for use by the media device 100 in a possible next state of the media device 100. The cache management module 104 may predict the next state of the media device 100 based on the media device's 100 current state, and retrieve content frames for the possible next state while the media device 100 is in a current state. For example, if the media device 100 is playing content at a normal speed, possible next states might include fast-forwarding at 2× speed, rewinding at 2× speed, or skipping to the next section of content. The cache management module 104 might form an estimate of the relative likelihood of these states and select one as the most likely. The estimated likelihood may refer to an estimated probability of the state occurring, given various factors such as the current state. The cache management module 104 might, for example, select fast-forwarding at 2× speed as the state most likely to follow the current state of playing content back at normal speed.

The cache management module 104 may improve efficient utilization of the memory 106 by downloading a subset of content frames from the content source 110. The subset of content frames may correspond to those that would be utilized in the most likely next state that was identified by the cache management module 104. In cases where the most likely next state is fast-forwarding, the subset of frames might correspond to key frames separated temporally by an amount of time that is proportional to the fast-forwarding rate. For example, for a 2× fast-forward speed, the cache management module 104 might request from the content source 110 a discontinuous set of frames, where the time between each frame is twice what it would be when the content is played at normal-speed playback. In some instances, the requested frames may comprise a key frame and a discontinuous set of key frames or differential frames, such as I or P frames. In other cases, the frames may comprise a key frame and P frames, without including B frames.

Figure 2:
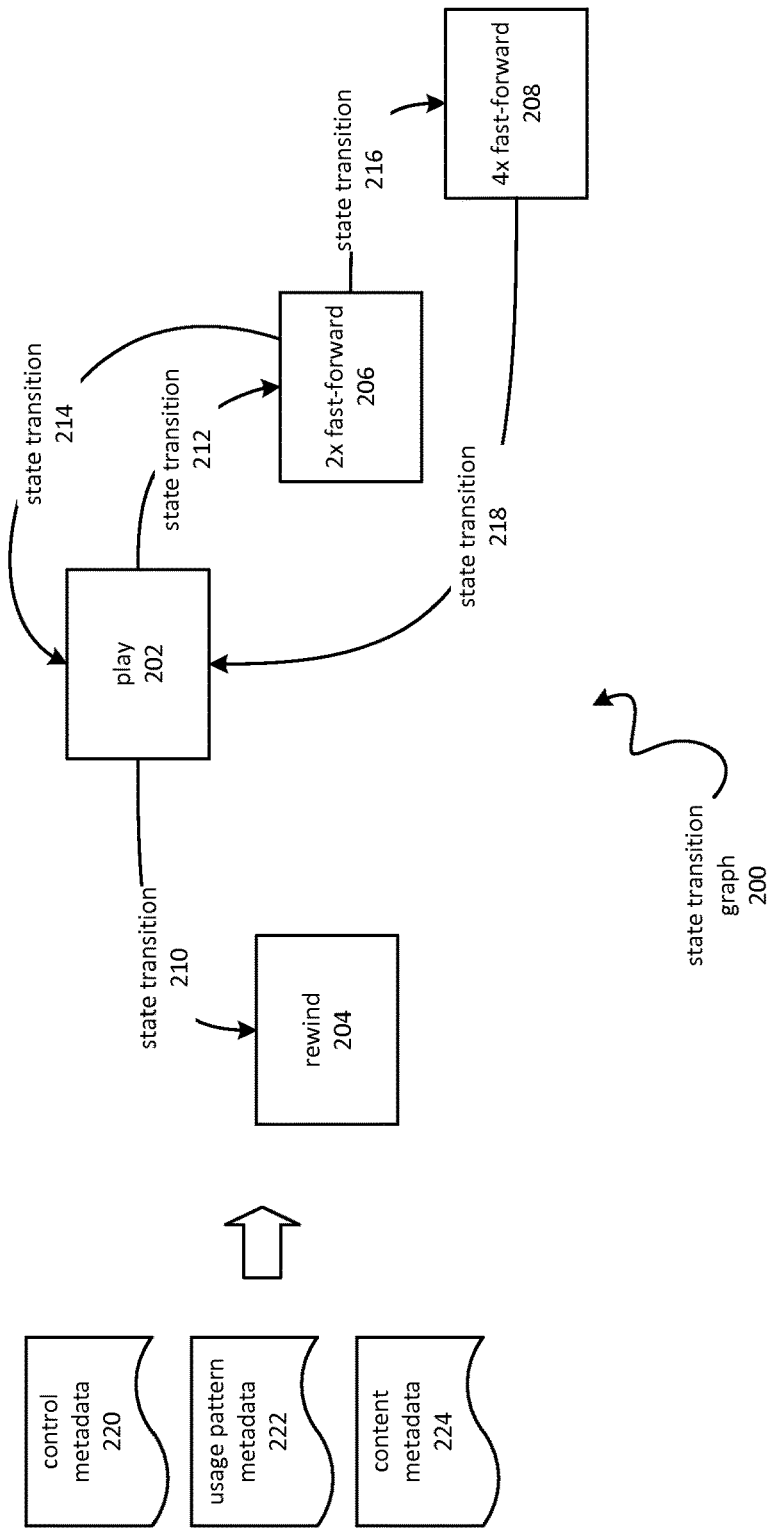
FIG. 2 is a diagram depicting determination of a likely next state.

The cache management module 104 may predict a likely next state of the media device 100 based on a number of factors. FIG. 2 is a diagram depicting determination of a likely next state.

The cache management module 104 may access a state transition graph 200, or some other data structure capable of representing state relationships such as those depicted in FIG. 2. These may include data structures such as lists, arrays, maps, or graphs. Alternatively, a procedural mechanism such as those that utilize case statements or "if . . . then . . . else" statements may be utilized to represent the depicted state relationships. It will be appreciated, however, that the particular states 202-208 and state transitions 210-218 depicted in FIG. 2 are provided for explanatory purposes, and should not be construed as limiting the scope of the present disclosure.

Based on control metadata 220, the cache management module 104 might determine that when the media device 100 is in a play 202 state, two of the next possible states are a rewind 204 state and a 2× fast-forward 206 state. The possible states might be limited by the controls used to operate the media device 100. For example, a remote control device might only possess a single fast-forward button, which could be pressed once to enter the 2× fast-forward 206 state and twice to enter a 4× fast-forward 208 state. As a result, from the play 202 state the 2× fast-forward 206 state might be a possible next state. Similarly, from the 2× fast-forward 206 state, the possible states might be the play 202 state and the 4× fast-forward 208 state. The control metadata 220 may contain information that reflects these possible limitations on the next possible states of the media device 100.

The cache management module 104 might, in some instances, estimate likelihoods associated with various possible state transitions based on usage pattern metadata 222. The manner in which a user of the media device 100, or of users in general, may be indicative of patterns such as frequently rewinding after fast-forwarding, frequently advancing to a faster fast-forward speed, and so forth. In FIG. 2, for example, the cache management module 104 might estimate relative probabilities of transitioning from the 2× fast-forward 206 state to either one of the play 202 state or the 4× fast-forward 208 state.

The likelihood of particular state transitions may also be determined with respect to content metadata 224. The cache management module 104 might, for example, determine that the play 202 state is more likely than the 4× fast-forward 208 state, relative to a current 2× fast-forward 206 state, when a content boundary is being approached. This might be the case, for example, if the user is fast-forwarding through the credit sequence of a television program or a movie.

The state transitions predicted by the cache management module 104 may be used to download content frames that may be accessed if the media device 100 enters the predicted state. In various instances, the cache management module 104 may use the state transition graph 200, or some equivalent, to predict which state may be the most likely to occur next and to transmit requests to the content source 110 to download frames that could be used if the media device 100 does enter that state.

Figure 3:
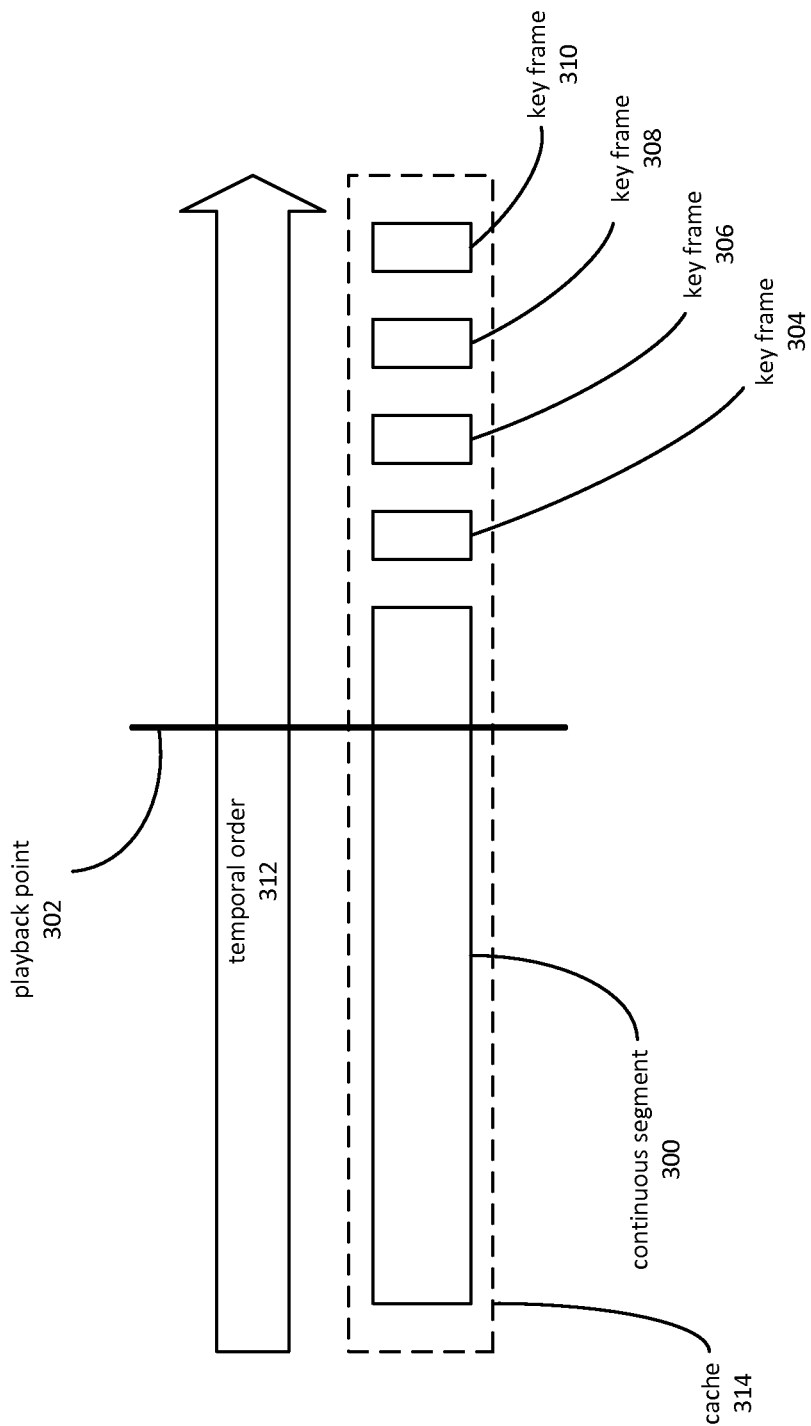
FIG. 3 is a diagram depicting content frames downloaded for a current state and an estimated next state.

FIG. 3 is a diagram depicting content frames downloaded for a current state and an estimated next state. FIG. 3 depicts the downloaded frames as being arranged according to a temporal order 312. It will be appreciated, however, that the depicted arrangement of the frames is for explanatory purposes, and should not be viewed as limiting the scope of the present disclosure.

Frames for a continuous segment 300 of the content may be downloaded to a cache, such as the memory 106 depicted in FIG. 1. The continuous segment 300 of the content may correspond to a temporally ordered portion of the content. It might, for example, comprise all key frames and differential frames corresponding to a 30-second period of the content.

The continuous segment 300 may be maintained by the cache management module 104 as a sliding window of content anchored on a playback point 302, which may refer to the portion of the content currently being displayed on the media device 100. The continuous segment 300 may comprise all of the key frames and differential frames needed for normal playback of the content for some period of time. For example, the continuous segment 300 may contain all I-frames, P-frames, and B-frames needed for normal playback for the period of time covered by the sliding window. In FIG. 3, the playback point 302 is depicted as being located somewhere towards the end of the continuous segment 300. In various aspects, location of the playback point 302 may be adjusted temporally forward or backward with respect to the playback point 302.

The continuous segment 300 may aid playback by reducing the incidence of various issues such as undesired pauses as well as minimizing latency effects when transitioning between states. These might occur, for example, when the user enters a rewind state and the media device 100 responds by contacting the content source 110 to obtain data to display during the rewind state. The benefit of maintaining the continuous segment 300 may increase according to its size. However, the size of the cache in which the continuous segment 300 is stored may typically be limited. A second set of data, depicted in FIG. 3 as a set of key frames 304, 306, 308, and 310, may be downloaded and stored in the cache in response to estimating which of various possible playback states are likely to follow the current playback state of the media device 100.

The key frames 304-310 may correspond to points in the content that are temporally separated by some amount of time. The amount of time may be proportional to the state that has been estimated as being a likely next state. For example, if the predicted next state is a fast-forward function that displays content at a rate that is four times greater than normal speed playback, then the key frames may correspond to points in the content that are temporally separated by an amount of time that is suited to playback at four times normal speed. If key frames for content playback at normal speed correspond to points in the content that allows for normal-speed playback at 30 frames per second, the key frames downloaded for the predicted next state of playback at four times normal speed might correspond to points in the content that would play back at 7.5 frames per second if played back at normal speed, and when played back at 30 frames per second give the effect of playing back at four times normal speed. Accordingly, the cache portion for the predicted next state might include key frames corresponding to points in the content at 7.5 frames per second instead of 30 frames per second. In some instances, this may be equivalent to skipping three out of every four key frames in the content.

The cache management module 104 may periodically refresh the continuous segment 300 and the set of key frames 304-310 so that they remain current. For example, as time passes, the older portions of the continuous segment 300 may be removed from a cache 314, as more recent frames (with respect to the temporal order 312 of the content) are added. In some instances, the key frames 304-310 may be I-frames. The key frames 304-310 downloaded in anticipation of a possible next state may be incorporated into the continuous segment 300, thus helping to avoid the downloading of duplicative data. In some instances, older key frames may be dropped from the set of key frames 304-310 as more recent frames are added.

In some instances, some or all of key frames 304-310 may be replaced by non-key frames, such as P-frames or B-frames. This may occur, for example, where a previous key frame may be used in combination with a differential frame, even though the frames are discontinuous.

Figure 4:
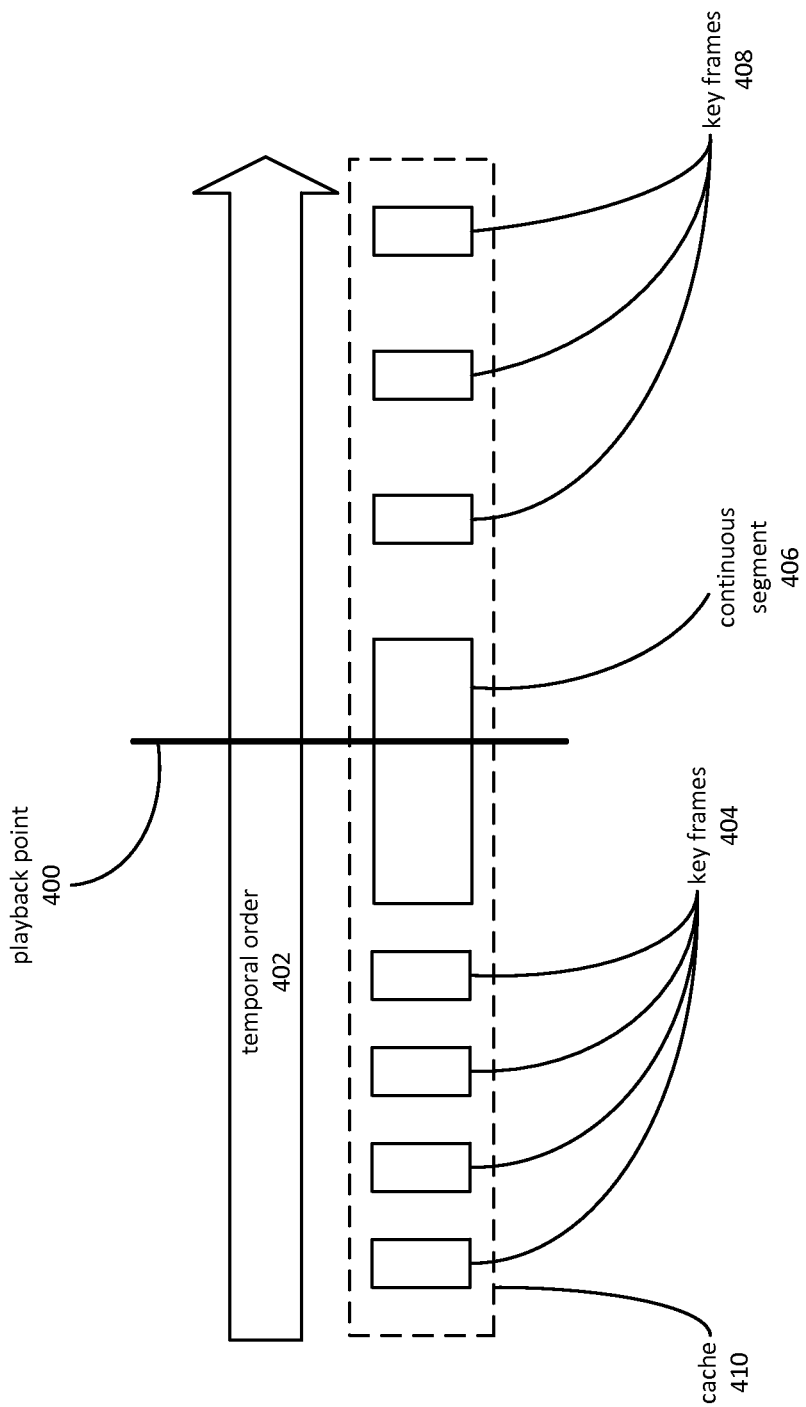
FIG. 4 is a diagram depicting content frames downloaded for a current state and two estimated next states.

In some instances, the cache management module 104 may maintain data for two or more predicted next states. FIG. 4 is a diagram depicting content frames downloaded for a current state and two estimated next states. As an example, FIG. 4 depicts these two states as a rewind state and a fast-forward state. These examples are intended to be illustrative, and should not be viewed as limiting the scope of the present disclosure. A temporal order 402 is depicted in order to illustrate the logical ordering of data within a cache 410. However, it will be appreciated that in various instances the actual ordering of data within the cache 410 may be varied.

A continuous segment 406 of the content may be maintained as a sliding window around a playback point 400. However, as compared to the continuous segment 300 in FIG. 3, the continuous segment 406 depicted in FIG. 4 may be smaller, allowing for more room in the cache 410 for data that may be used in a possible next state of the media device 100. For example, as depicted in FIG. 4, a set of key frames 404 may be stored in the cache 410 for a possible rewind state, and another set of key frames 408 may be stored for a possible fast-forward state. The key frames 404 may represent a complete frame in a stream of content. For example, in an MPEG video stream, a key frame, sometimes called an I-frame, may be included periodically to represent a complete frame. The data for the I-frame may consist, for example, of bitmap data for the image corresponding to the frame. In addition to I-frames, the stream may include differential frames. Each differential frame may represent changes to the displayed video frame relative to an I-frame. B-frames are bi-directional differential frames that may reference preceding and subsequent I-frames. P-frames are differential frames that describe changes to the image subsequent to a preceding I-frame. By processing the stream of I-frames, B-frames, and/or P-frames, an MPEG decoder may produce and display a continuous sequence of frames, and thereby render a moving image.

The latency, or time to respond, to a request to retrieve those additional frames may affect the number of frames that media device 100 may download prior to a transition to the next state. For example, if request latency is 500 milliseconds, the number of key frames 408 for the fast-forward state in the cache 410 may be sufficient to sustain the fast-forward playback for 500 milliseconds. In some instances, the deviation of latency values from an average might also be used in determining how many frames are downloaded.

In some instances, the amount of cache space devoted to two or more next possible states may be adjusted with respect to the respective likelihood of those states. For example, if a likelihood of the next state being a rewind state is calculated to be less than that of the fast-forward state, then the key frames 404 for the rewind state may be given less space than the key frames 408 for the fast-forward state.

In some instances, the number of next possible states for which cache space is allocated may be based on latency factors. The media device 100 may store a sufficient quantity of key frames to support playback at a rate appropriate for the next state while also retrieving additional frames for that state. When fewer frames are needed to represent a particular next state, the media device 100 is able to store data for more possible states in the cache.

In some instances, data downloaded for playback of a next possible state may be adjusted based on playback characteristics of the current state. For example, the quality of a current playback state may be identified and reflected in the quality of content data downloaded for a next possible state. This may allow for more seamless transitions between playback states, since factors such as resolution or color depth may be held constant in both a current and next playback state. Referring to FIG. 4, for example, the data downloaded for continuous segment 406 may correspond to a particular level of resolution and color depth. The resolution and color depth for the key frames 404-408 downloaded for next possible states may be selected to match those of continuous segment 406.

Figure 5:
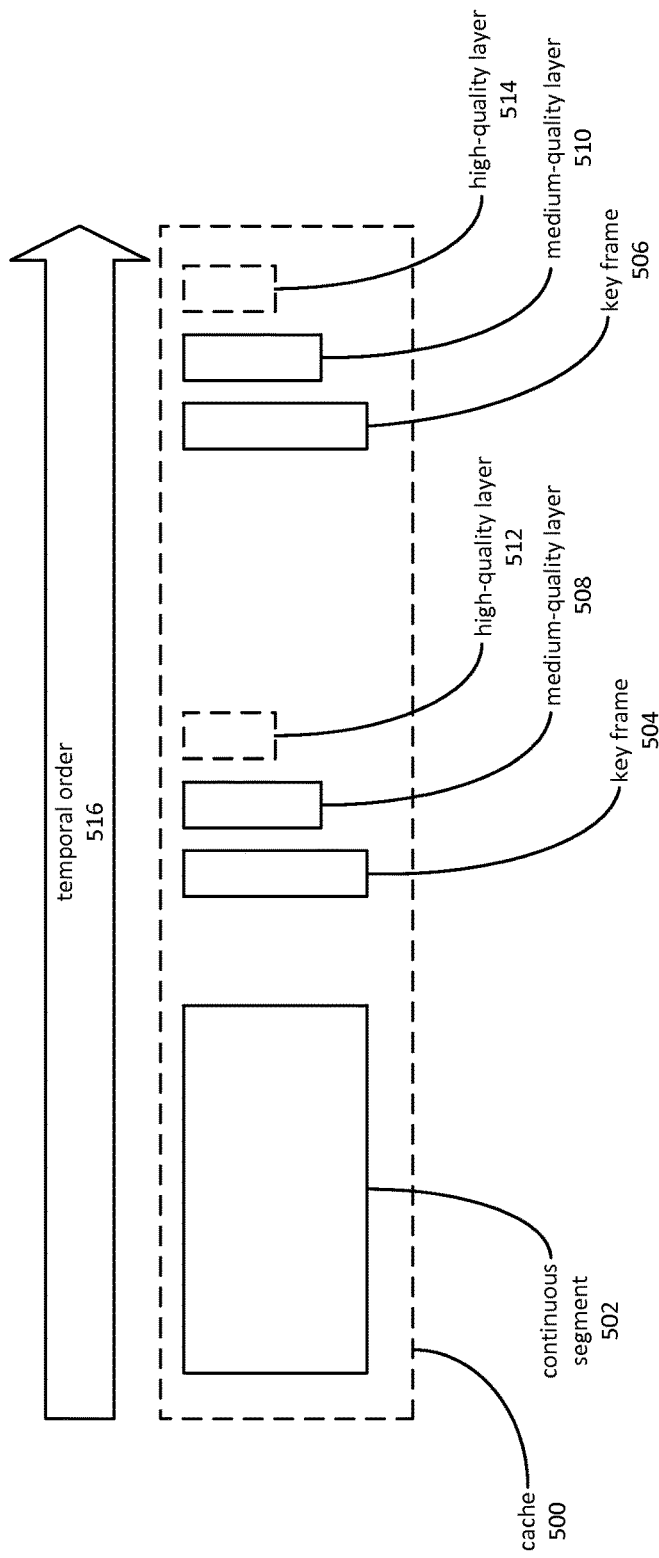
FIG. 5 depicts an example of a cache comprising quality-adjusted key frames.

FIG. 5 depicts an example of a cache comprising quality-adjusted key frames. A temporal order 516 is depicted in order to illustrate the logical ordering of data within a cache 500. However, it will be appreciated that in various instances the actual ordering of data within the cache 500 may be varied.

The cache 500 may have stored within it data for a continuous segment 502 of content corresponding to a current playback state. A playback characteristic of the current state might correspond to factors such as resolution or color depth. For example, scalable video coding ("SVC") or high-efficiency video coding ("HEVC") may allow for increases or decreases to video resolution within transmitted content. One way this may be accomplished is through the use of a key frame at a lower resolution and one or more additional quality layers that may provide additional resolution. The quality layers may be included or excluded based on a sustainable rate at which content can be received by a client, such as the media device 100 depicted in FIG. 1. Accordingly, it might be the case that the cache 500 has stored within it key frames and quality layers corresponding to the quality level of the current state.

For a next possible state, the cache 500 may have stored within it a number of key frames 504 and 506. In addition, if the quality level of the current state is medium, then the cache 500 could have stored within it medium-quality layers 508 and 510 corresponding to the key frames 504 and 506. If the quality level of the current state became high-quality, then high-quality layers 512 and 514 corresponding to the key frames 504 and 506 could also be added to the cache 500. By storing quality layers corresponding to the current playback state, there may be a reduction in perceived quality differences between the playback during the current state and playback during the next state.

In one example, an SVC encoding might include a base layer corresponding to a "low" video quality. The base layer might, for example, be encoded at a 480p resolution. The SVC encoding might also include an additional encoding layer corresponding to a "medium" video quality providing 720p resolution, and a "high" video quality providing 1080p resolution. The key frames 504 and 506 might be at 480p resolution. If data for the continuous segment 502 has been received at the medium video quality, the medium-quality layers 508 and 510 might also be downloaded in addition to the key-frames 504 and 506, in order to enhance the resolution of the key frames 504 and 506 to 720p.

Figure 6:
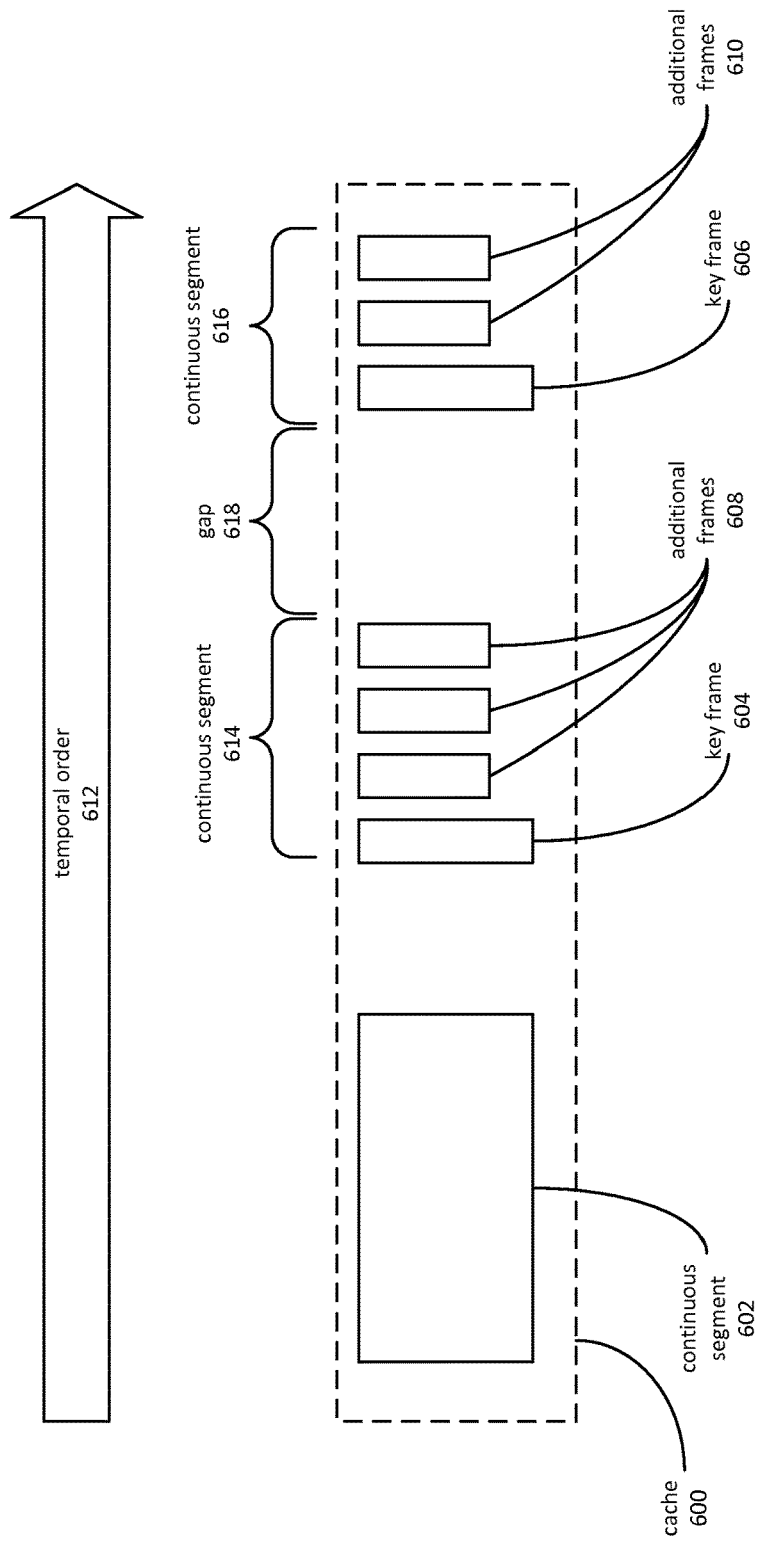
FIG. 6 depicts an example of a cache comprising continuous segments of frames anchored by key frames for a possible next state.

In some instances, the cache management module 104 may, in anticipation of a possible next state, download continuous segments of content anchored by a key frame. FIG. 6 depicts an example of a cache comprising continuous segments of frames anchored by key frames for a possible next state. A temporal order 612 is depicted in order to illustrate the logical ordering of data within a cache 600. However, it will be appreciated that in various instances the actual ordering of data within the cache 600 may be varied.

The cache 600 may have stored within it a continuous segment 602 of frame data. The continuous segment 602 may comprise both key frames and differential frames corresponding to a continuous segment of the content (i.e., a segment of the content without any temporal gaps). The cache management module 104 may cause key frames 604 and 606 to be downloaded in anticipation of a possible next state. The key frames 604 and 606 may be separated temporally by an amount of time that is based on the speed of playback in the possible next state.

The cache management module 104 may also download additional frames 608 and 610 in anticipation of the possible next state. A set of additional frames 608 may comprise differential frames associated with the corresponding key frame 604. Note that although FIG. 6 depicts the differential frames 608 as being temporally ordered subsequent to the corresponding key frame 604, in some cases a differential frame may refer to a key frame that occurs after the differential frame in temporal order. The additional frames 608 corresponding to key frame 604 might also comprise key frames. Taken together, the key frame 604 and the additional frames 608 may represent a continuous segment 614 of the content.

The length of the continuous segment 614 of the content formed by the key frame 604 and the additional frames 608 may be based on latency factors, such as an amount of time estimated by the cache management module 104 to be needed to receive additional frames to continue playback at a point starting on key frame 604. For example, if the media device 100 were to resume normal speed playback after a fast-forward operation, starting with the key frame 604, the additional frames 608 might be used to allow for normal speed playback while the frames filling in a gap 618 between two continuous segments 614 and 616 may be retrieved from the content source 110. Note that the depicted gap 618 refers to separation of the frames with respect to points in the content, not to unfilled space in the cache 600.

In some instances, the continuous segments 614 and 616 may be of unequal length. For example, the number of the additional frames 610 in one continuous segment 616 might be fewer than in another continuous segment 614. In some instances, the number of frames in a particular segment may be based on temporal distance. In some instances, the cache management module 104 may download fewer frames for the more distant continuous segment 616.

Figure 7:
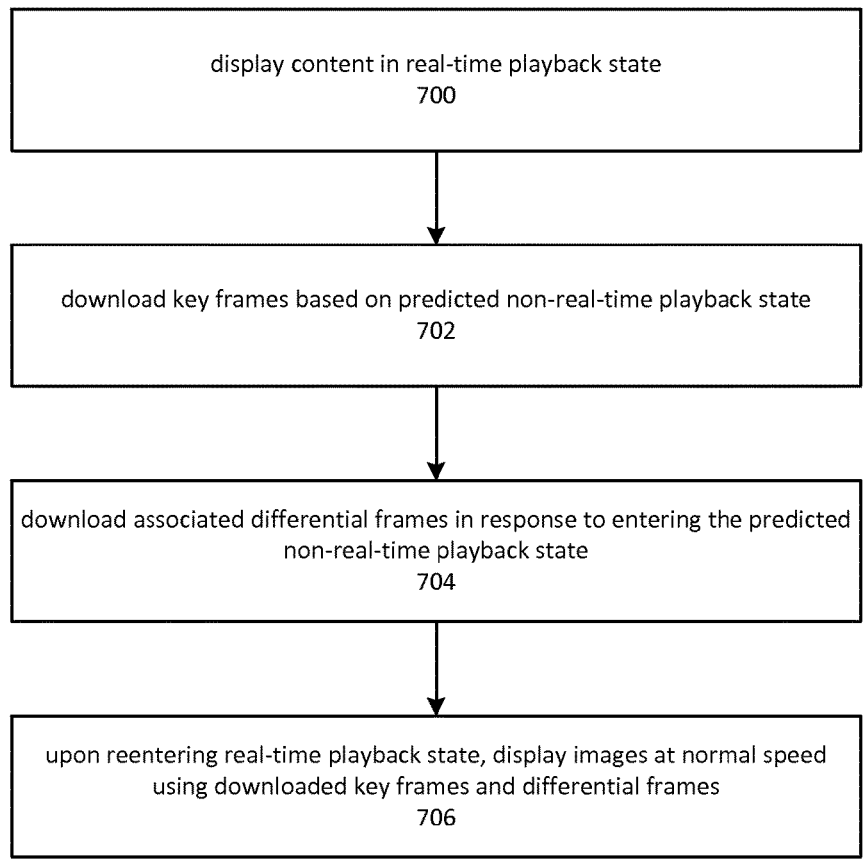
FIG. 7 is a flow diagram depicting a process for managing cache usage of a media device.

FIG. 7 is a flow diagram depicting a process for managing cache usage of a media device. Although FIG. 7 is depicted as a sequence of steps, the depicted sequence should not be construed as limiting the scope of the present disclosure. In various cases, aspects, and embodiments, the steps and depicted operations may be altered, omitted, reordered, or performed in parallel.

At block 700, a media device may display content in a real-time playback state. A real-time playback state may refer to content playback at normal viewing speed, including live broadcasts or other transmitted content. Typically, real-time playback involves continuous segments of content data including key frames and differential frames. For example, in an MPEG movie, a real-time playback state may include processing of I-frames, B-frames, and P-frames.

While in a real-time playback state, the media device may download key frames based on a predicted next state. The media device may, for example, calculate an estimated likelihood that the next state will be a non-real-time playback state such as fast-forward or rewind. These states are sometimes referred to as "trick play" states. As depicted by block 702, the media device may download key frames based on the predicted next state. The downloaded key frames may, moreover, correspond to the predicted next state being a non-real-time playback state. For example, the period of time between the downloaded key frames may be based in part on the speed of the fast-forward state and in part on the period of time between key frames in the content source.

Block 704 depicts the media device downloading differential frames associated with the downloaded key frames in response to entering the predicted next state. For example, upon entering the non-real-time playback state, the media device may predict that the next most likely state is a real-time playback state. The media device may then begin downloading differential frames associated with the previously downloaded key frames.

Block 706 depicts the media device, upon reentering the real-time playback state, displaying images at a normal speed using the downloaded key frames and the downloaded differential frames.

The media device may, in some instances, base cache utilization on the current playback state and the predicted next state. While playing back content at normal speed, the media device may utilize its cache by filling a portion of the cache with a continuous segment centered on the current playback point, and filling another portion with key frames for a predicted next state. The predicted next state may be a non-real-time or "trick play" state that may be displayed using the downloaded key frames when the trick play state is entered. While in the trick play state, the media device may fill a portion of its cache with key frames centered around the playback point of the current trick play state. The media device may fill another portion of its cache with frames for a predicted next state, such as a real-time playback state. In some cases, this may involve downloading differential frames associated with the key frames being used to display the current trick play state. The downloading of the differential frames may be based on a predicted playback point for the predicted next state. For example, if in a fast-forward state, the media device may estimate a likely initial point for playback at normal speed, and download differential frames associated with key frames at and subsequent to that point.

Figure 8:
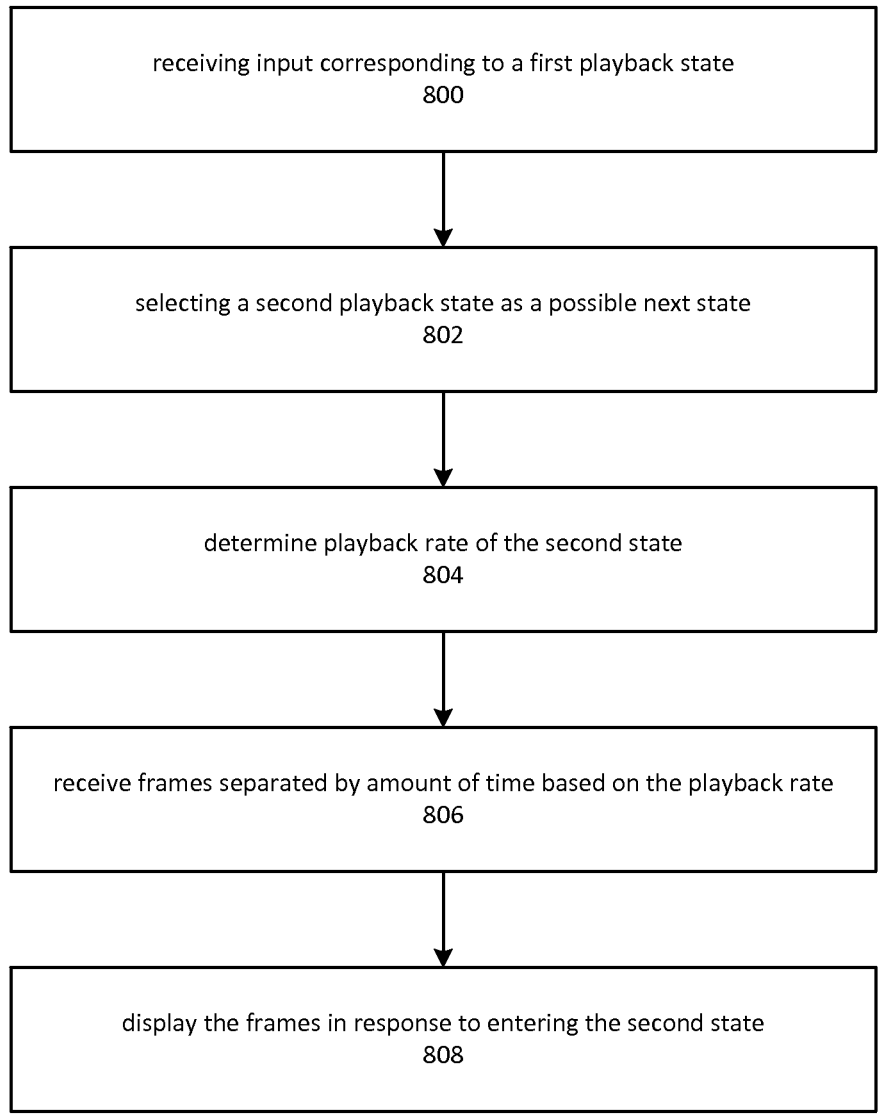
FIG. 8 is a flow diagram depicting a process for managing cache usage of a media device.

FIG. 8 is a flow diagram depicting a process for managing cache usage of a media device. Although FIG. 8 is depicted as a sequence of steps, the depicted sequence should not be construed as limiting the scope of the present disclosure. In various cases, aspects, and embodiments, the steps and depicted operations may be altered, omitted, reordered, or performed in parallel.

At block 800, a media device may receive input corresponding to a first playback state. This could, for example, include a media device receiving input from a remote control instructing the media device to begin playing content at an ordinary viewing speed. The input might, for example, supply a channel for content or indicate that a recorded program should be played. The cache management module 104 may, in receiving and processing the input, begin to download content to a cache maintained in a memory of the media device.

At block 802, the cache management module 104 may select a second playback state as a next possible state. As depicted by FIG. 2, a given state such as a play 202 state may be associated with one or more other states that are reachable from that state. In FIG. 2, for example, the 2× fast-forward 206 state and the rewind 204 state are reachable from the play 202 state. The cache management module may, based on various probabilities associated with reachable states, select a state as the one that is most likely to be the next state. In some instances, the cache management module 104 may base amounts of storage space to use for caching data for possible states, based on the respective probabilities calculated by the cache management module 104.

As depicted by block 804, the cache management module may determine a rate of playback for the second state. The playback rate may refer to frames displayed per unit of time. The playback rate may correlate to frames of the content that may be skipped or added while playback is in the second state. For example, if each frame of the content is played back during normal-speed playback, then every other frame might be played back when the rate of playback is twice as high. Alternatively, if current playback state is fast forward or rewind where not all frames are played back, then in the second state every frame may be played back.

Block 806 depicts transmitting a request to receive frames that may correspond to points in the content that are temporally separated by an amount of time that may be based at least in part on the playback rate. For example, for normal speed playback, each frame might be temporally separated by approximately 33 milliseconds, assuming a 30 frames-per-second frame rate. At two times normal speed, the request to receive the frames might indicate that the frames should represent points in the content that are approximately 66 milliseconds apart. In some instances, the request may specify that related content, such as audio content associated with video content, is to be excluded. In other instances, the request may specify (or it could be implied) that related content should be included.

Figure 9:
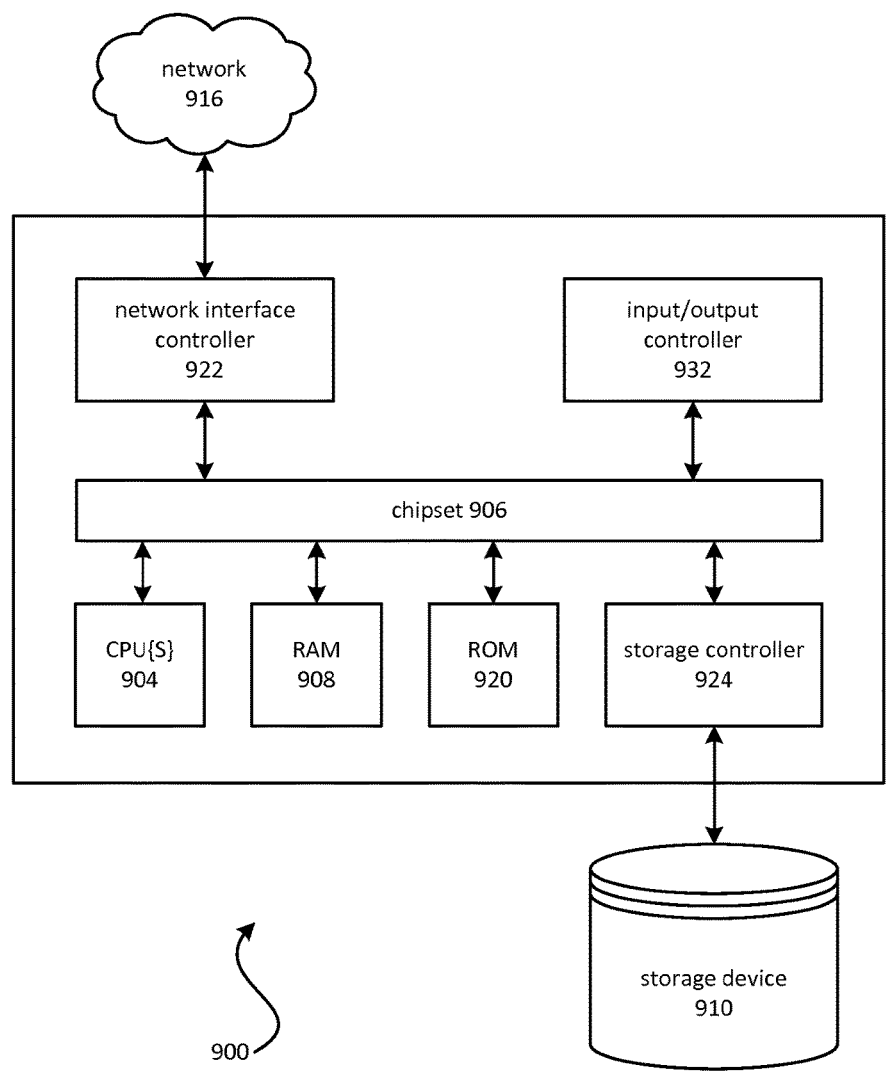
FIG. 9 is a block diagram depicting various aspects of a computing environment in which aspects of the present disclosure may be practiced.

Block 808 depicts displaying the frames in response to entering the second state. Displaying the frames may comprise displaying frames received in response to the request transmitted at block 806. The phase and rate of playback may be aligned to that of the received frames. For example, upon entering a playback state corresponding to two times normal speed, the playback module 102 might, continuing the example of the preceding paragraph, display the received frames at a rate of one frame every 66 milliseconds. It may be the case that more frames than necessary have been received, or that the received frames don't align precisely with the desired phase or rate of playback. In such cases, the phase can be aligned by delaying the display of certain frames and the rate at which frames are played FIG. 9 depicts a computing device that may be used in various aspects, such as the media device 102 depicted in FIG. 1. The computer architecture shown in FIG. 9 may correspond to a set-top box, remote control device, home automation system, desktop computer, laptop, tablet, network appliance, e-reader, smartphone, or other computing device, and may be utilized to execute any aspects of the computers described herein, such as to implement the operating procedures of FIGS. 7 and 8.

A computing device 900 may include a baseboard, or "motherboard," which is a printed circuit board to which a multitude of components or devices may be connected by way of a system bus or other electrical communication paths. One or more central processing units ("CPUs") 904 may operate in conjunction with a chipset 906. CPU(s) 904 may be standard programmable processors that perform arithmetic and logical operations necessary for the operation of computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may, in various embodiments, be augmented with or replaced by other processing units, such as GPU(s) (now shown). GPU(s) may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 806 may provide an interface to a random access memory ("RAM") 908 used as the main memory in the computing device 900. The chipset 906 may further provide an interface to a computer-readable storage medium, such as a read-only memory ("ROM") 920 or non-volatile RAM ("NVRAM") (not shown), for storing basic routines that may help to start up the computing device 900 and to transfer information between the various components and devices. ROM 920 or NVRAM may also store other software components necessary for the operation of the computing device 900 in accordance with the aspects described herein.

The computing device 900 may operate in a networked environment using logical connections to remote computing nodes and computer systems through a local area network ("LAN") 916. The chipset 906 may include functionality for providing network connectivity through a network interface controller (NIC) 922, such as a gigabit Ethernet adapter. The NIC 922 may be capable of connecting the computing device 900 to other computing nodes over the network 916. It should be appreciated that multiple NICs 922 may be present in the computing device 900, connecting the computing device to other types of networks and remote computer systems.

The computing device 900 may be connected to a mass storage device 910 that provides non-volatile storage for the computing device 900. The mass storage device 910 may store system programs, application programs, other program modules, and data, which have been described in greater detail herein. The mass storage device 910 may be connected to computing device 900 through a storage controller 924 connected to the chipset 906. The mass storage device 910 may consist of one or more physical storage units. A storage controller 924 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 900 may store data on the mass storage device 910 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 910 is characterized as primary or secondary storage and the like.

For example, the computing device 900 may store information to the mass storage device 910 by issuing instructions through the storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from mass storage device 910 by detecting the physical states or characteristics of one or more particular locations within the physical storage units.

In addition to the mass storage device 910 described above, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 910 may store an operating system utilized to control the operation of the computing device 900. According to one embodiment, the operating system comprises a version of the LINUX operating system. According to another embodiment, the operating system comprises a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 910 may store other system or application programs and data utilized by the computing device 900.

The mass storage device 910 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described above. The computing device 900 may have access to computer-readable storage media storing computer-executable instructions, which, when executed by the computing device 900, may perform operating procedures depicted in FIG. 8.

The computing device 900 may also include an input/output controller 932 for receiving and processing input from a number of input devices, such as a keyboard, a mouse, a touchpad, a touch screen, an electronic stylus, or other type of input device. Similarly, the input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing node may be a physical computing device, such as the computing device 900 of FIG. 9. A computing node may also include a virtual machine host process and one or more virtual machine instances operating on a physical computing device, such as the computing device 900. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the following detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to diagrams and flowchart illustrations of methods, systems, apparatuses and computer program products. It will be understood that each block of the diagrams and flowchart illustrations, and combinations of blocks in the diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices disclosed herein. It is intended that the specification and example figures be considered as exemplary only, with a true scope and spirit being indicated by the following claims.

What is claimed is:

1. A method comprising:
   receiving information indicative of a first state of content playback by a media device;
   determining, based on a probability of transitioning to a second state of content playback from the first state of content playback, a prediction of the second state of content playback;
   transmitting, to a computing device, a message comprising a request, based on the determined prediction of the second state of content playback, for a plurality of frames of content that are each separated by an amount of time based at least in part on a rate of playback associated with the second state of content playback;
   receiving, from the computing device, the plurality of frames of content based on the request;
   storing in memory the received plurality of frames of content; and
   causing presentation of one or more of the plurality of frames of content based on the media device entering the second state of content playback.

2. The method of claim 1, wherein the plurality of frames of content comprises key frames, wherein the key frames are I-frames indicative of a complete image.

3. The method of claim 2, further comprising:
   transmitting a request to receive one or more differential frames based on the media device entering the first state of content playback from the second state of content playback, each of the I-frames being associated with the one or more differential frames, wherein the one or more differential frames comprises at least one of B-frames or P-frames, wherein B-frames and P-frames are indicative of changes to an image with respect to an I-frame.

4. The method of claim 3, wherein a number of frames included in the one or more differential frames is based at least in part on a latency characteristic of communication with the computing device.

5. The method of claim 1, further comprising:
   transmitting a request to receive a second plurality of frames in response to displaying one or more of the plurality of frames of content.

6. The method of claim 1, further comprising:
   receiving a continuous segment of content, the continuous segment overlapping a current playback point of the content.

7. The method of claim 1, wherein the first state of content playback corresponds to playback of the content at a first speed and the second state of content playback corresponds to playback of the content at a second speed.

8. The method of claim 1, further comprising:
   receiving a second plurality of frames of content, wherein the second plurality of frames of content corresponds to a third state reachable from the first state of content playback.

9. The method of claim 1, further comprising:
   determining one or more states of the media device that are reachable from the first state of content playback based at least in part on an interface of the media device.

10. The method of claim 1, wherein the probability is based on playback location.

11. The method of claim 1, wherein the probability is based on usage pattern metadata.

12. A method comprising:
    transmitting, to a media device in a first state of content playback, content comprising a first plurality of key frames and a first plurality of differential frames, each of the first plurality of key frames being associated with one or more of the first plurality of differential frames;

receiving, from the media device, a message comprising a request for a second plurality of key frames that are each separated by an amount of time based at least in part on a rate of playback associated with a second state of content playback that was predicted by the media device based on a probability of transitioning to the second state of content playback from the first state of content playback;

transmitting, to the media device, the second plurality of key frames; and transmitting, based on the media device leaving the second state of content playback, a second plurality of differential frames associated with the second plurality of key frames.

13. The method of claim 12, further comprising:

transmitting additional frames corresponding to a continuous segment of the content temporally adjacent to a frame of the second plurality of key frames.

14. The method of claim 13, wherein a length of the continuous segment is based at least in part on request latency.

15. The method of claim 13, wherein a length of the continuous segment is based at least in part on a state predicted to follow the second state of content playback.

16. The method of claim 12, wherein key frames of the first plurality of key frames are I-frames indicative of a complete image and the first plurality of differential frames comprises at least one of B-frames or P-frames, wherein B-frames and P-frames are indicative of changes to an image with respect to an I-frame.

17. The method of claim 12, wherein the probability is based on playback location.

18. The method of claim 12, wherein the probability is based on usage pattern metadata.

19. A device comprising:

one or more processors; and memory storing instructions that, when executed by the one or more processors, cause the device to:

receive information indicative of a first state of content playback by a media device;

determine, based on a probability of transitioning to a second state of content playback from the first state of content playback, a prediction of the second state of content playback;

transmit, to a computing device, a message comprising a request, based on the determined prediction of the second state of content playback, for a plurality of frames of content that are each separated by an amount of time based at least in part on a rate of playback associated with the second state of content playback;

receive, from the computing device, the plurality of frames of content based on the request;

store in memory the received plurality of frames of content; and cause presentation of one or more of the plurality of frames of content based on the media device entering the second state of content playback.

20. The device of claim 19, wherein the probability is based on playback location or usage pattern metadata.

* * * * *